United States Patent
Benjamin et al.

(10) Patent No.: US 10,453,087 B2
(45) Date of Patent: Oct. 22, 2019

(54) SYSTEMS AND METHODS FOR PROVIDING A CUSTOMER SERVICE

(71) Applicant: Capital One Financial Corporation, McLean, VA (US)

(72) Inventors: Moshe Benjamin, Midlothian, VA (US); Lawrence Douglas, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 816 days.

(21) Appl. No.: 14/499,979

(22) Filed: Sep. 29, 2014

(65) Prior Publication Data
US 2015/0095130 A1 Apr. 2, 2015

Related U.S. Application Data

(60) Provisional application No. 61/884,214, filed on Sep. 30, 2013.

(51) Int. Cl.
*G06Q 30/02* (2012.01)
*G06Q 40/08* (2012.01)

(52) U.S. Cl.
CPC ..... *G06Q 30/0226* (2013.01); *G06Q 30/0232* (2013.01); *G06Q 30/0236* (2013.01); *G06Q 40/08* (2013.01)

(58) Field of Classification Search
CPC ......... G06Q 30/06; G06Q 20/10; G06Q 20/20
See application file for complete search history.

(56) References Cited

U.S. PATENT DOCUMENTS

| 7,630,937 B1 * | 12/2009 | Mo | G06Q 20/10 705/34 |
| 2003/0036918 A1 * | 2/2003 | Pintsov | G06Q 20/04 705/1.1 |

(Continued)

FOREIGN PATENT DOCUMENTS

KR 2013062445 A * 6/2013 ............. G06Q 30/00

OTHER PUBLICATIONS

Todd J. Zywicki, "Economics of Credit Cards," The Chapman Law Review, vol. 3, pp. 79-172 (2000).*

*Primary Examiner* — Virpi H Kanervo
(74) *Attorney, Agent, or Firm* — Finnegan, Henderson, Farabow, Garrett & Dunner, LLP (57) ABSTRACT

The disclosed embodiments include systems and methods for providing customer service. The system may include one or more memory devices storing software instructions. The system may also include one or more processors configured to execute the software instructions to receive customer data and location data from a client device. The one or more processors may also execute the software instructions to identify a customer and a merchant based on the received data. The one or more processors may also execute the software instructions to determine an applicable customer service option based on at least the identified merchant and the identified customer, the customer service option including at least an option to activate a credit card secondary benefit, and transmit a notification to the client device, the notification including the customer service option when the identified customer is eligible for the determined customer service option.

19 Claims, 8 Drawing Sheets (56) References Cited

U.S. PATENT DOCUMENTS

| | | | |
|---|---|---|---|
| 2003/0055727 A1* | 3/2003 | Walker | G06Q 20/20 |
| | | | 705/14.17 |
| 2007/0005239 A1* | 1/2007 | Kirouchenaradje | |
| | | | G01C 21/3632 |
| | | | 701/533 |
| 2008/0027863 A1* | 1/2008 | Erdmann | G06Q 20/203 |
| | | | 705/44 |
| 2008/0065506 A1* | 3/2008 | Shillington | G06Q 30/0603 |
| | | | 705/26.81 |
| 2008/0097783 A1* | 4/2008 | Iannacci | G06Q 30/0281 |
| | | | 705/346 |
| 2014/0122213 A1* | 5/2014 | Wong | G06Q 30/0233 |
| | | | 705/14.33 |
| 2014/0172660 A1* | 6/2014 | Louie | G06Q 40/02 |
| | | | 705/35 |
| 2015/0066769 A1* | 3/2015 | Tallal, Jr. | G06Q 20/42 |
| | | | 705/44 |
| 2015/0199671 A1* | 7/2015 | Bajaj | G06Q 20/325 |
| | | | 705/39 |

* cited by examiner

SYSTEMS AND METHODS FOR PROVIDING A CUSTOMER SERVICE

PRIORITY CLAIM

This application claims priority under 35 U.S.C. § 119 to U.S. Provisional Application No. 61/884,214, filed on Sep. 30, 2013, which is expressly incorporated herein by reference in its entirety.

TECHNICAL FIELD

The disclosed embodiments generally relate to systems and methods for providing a customer service, and more particularly, systems and methods for the promotion and processing of secondary benefits associated with a financial account.

BACKGROUND

Financial service providers often offer various "secondary benefits" to their customers. For example, financial service providers that issue credit cards to consumers may offer various services that supplement the use of their credit cards. These programs may be used by consumers in conjunction with their credit card to receive a benefit such as rewards points, an extended warranty, an insurance plan, etc.

While benefits such as these are often useful, customers may be unaware of which services are available to them and in what situations they qualify to use them. Further, preconceived notions about such benefits may prevent customers from seeking more information about them. For example, complicated verification and processing requirements may deter customers from using secondary benefits.

Improving customer awareness of secondary benefits and ease of use may increase customer satisfaction. Therefore, a need exists to enhance use and processing of customer services, such as secondary benefits.

SUMMARY

Consistent with disclosed embodiments, systems, methods, and computer-readable media are provided for providing customer services.

Consistent with a disclosed embodiment, a system for providing a customer service is provided. The system may include one or more memory devices storing software instructions. The system may also include one or more processors configured to execute the software instructions to receive customer data and location data from a client device, identify a customer associated with the client device based on the customer data, and identify a merchant associated with the location based on the location data. The one or more processors may also execute the software instructions to determine an applicable customer service option based on at least the identified merchant and the identified customer, the customer service option including at least an option to activate a credit card secondary benefit, and transmit a notification to the client device, the notification including the customer service option when the identified customer is eligible for the determined customer service option.

Consistent with another disclosed embodiment, a method for providing a customer service is provided. The method may include receiving customer data and transaction data from a client device, the transaction data including information associated with a pending or completed transaction, and determining, by one or more processors, an applicable customer service option based on at least customer data and transaction data, the customer service option including at least an option for the customer to activate a customer service associated with the pending or completed transaction. The method may also include transmitting a notification to the client device, the notification including at least the customer service option, receiving customer input from the client device in response to the notification indicating acceptance of the customer service option, and providing the customer service based on the customer input.

Consistent with another disclosed embodiment, a system for providing a customer service is provided. The system may include one or more memory devices storing software instructions and an interface device. The system may also include one or more processors configured to execute the software instructions to receive product information associated with a product, and transmit the product information to a financial service provider device. The one or more processors may be further configured to execute the software instructions to receive a customer service option associated with the product from the financial service provider device, and display, by the interface device, the customer service option associated with the product including eligibility for the customer service.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Consistent with disclosed embodiments, systems and method for improving the processing and provision of customer services is provided. In one embodiment, the disclosed systems and methods allow for faster and more efficient processing and use of secondary benefits associated with a credit card. In one aspect, by improving the channels of communication between a customer and their credit card provider at relevant times, the disclosed embodiments increase the customer's awareness of the benefits that are available and increase the credit card provider's awareness of customer activity that may be eligible for a benefit.

Figure 1:
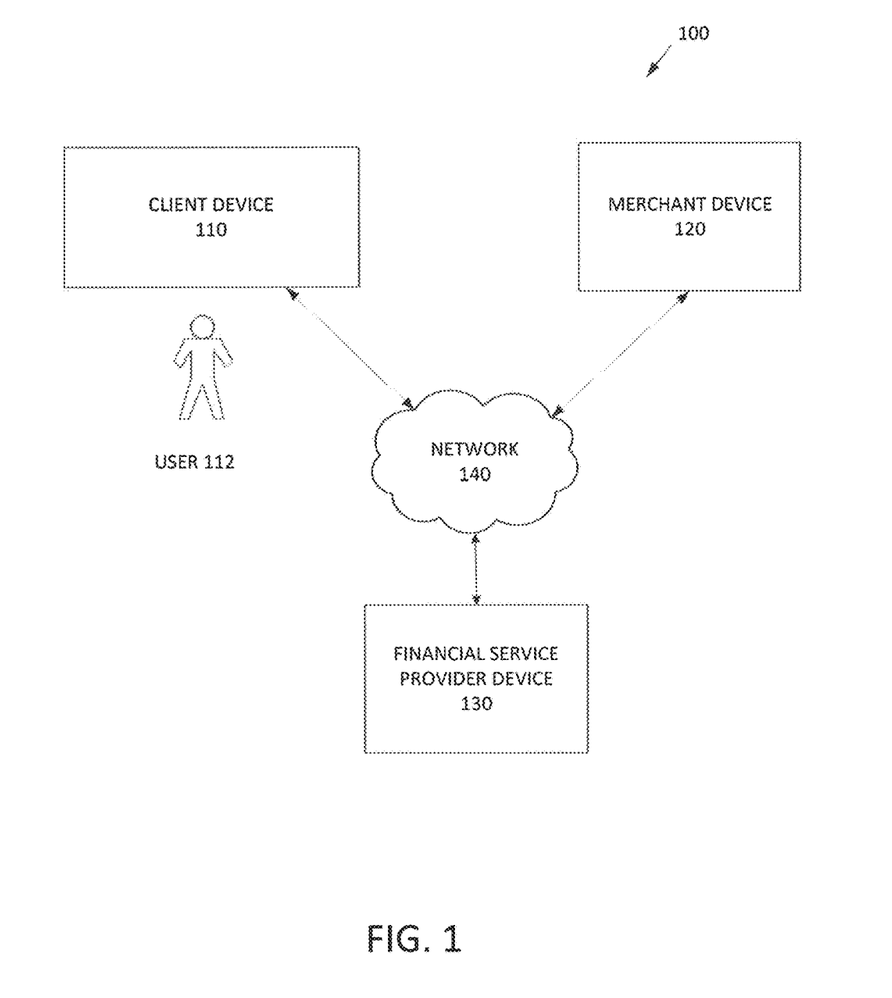
FIG. 1 is a block diagram of an exemplary system, consistent with disclosed embodiments.

FIG. 1 is a block diagram illustrating an exemplary system 100 for performing one or more operations consistent with the disclosed embodiments. In one embodiment, system 100 may include a client device 110, a merchant device 120, a financial service provider device 130, and a network 140. The components and arrangement of the components included in system 100 may vary. For example, system 100 may further include one or more of the components of system 100 and/or other components that perform or assist in the performance of one or more processes consistent with the disclosed embodiments.

Components of system 100 may be computing systems configured to provide, use, and/or process customer services. As further described herein, components of system 100 may include one or more computing devices (e.g., computer(s), server(s), embedded systems, etc.), memory storing data and/or software instructions (e.g., database(s), memory devices, etc.), etc. In some embodiments, the one or more computing devices are configured to execute software instructions stored on one or more memory devices to perform one or more operations consistent with the disclosed embodiments. Components of system 100 may be configured to communicate with one or more other components of system 100, including client device 110, merchant device 120, and financial service provider device 130. In certain aspects, users may operate one or more components of system 100 to initiate one or more operations consistent with the disclosed embodiments. For example, client device 110 may be operated by a user 112. User 112 may be an owner/operator of client device 110, such as a customer of one or more entities associated with components of system 100. In other aspects, the one or more users may be employees of, or associated with, the entity corresponding to the respective component(s) of system 100 (e.g., someone authorized to use the underlying computing systems or otherwise act on behalf of the entity). In other aspects, the one or more users may not be an employee or otherwise associated with the underlying entity. In some aspects, the one or more users may be an entity, rather than an individual(s), associated with the respective component.

Client device 110 may be one or more computing devices configured to execute software instructions for performing one or more operations consistent with the disclosed embodiments. In one embodiment, client device 110 may be a mobile device (e.g., tablet, smartphone, etc.), a desktop computer, a laptop, a server, a wearable screen or headset, and/or device dedicated hardware device. Client device 110 may include one or more processors configured to execute software instructions stored in memory, such as memory included in client device 110. Client device 110 may include software that, when executed by a processor, performs known Internet-related communication and content display processes. For instance, client device 110 may execute browser software that generates and displays interface screens including content on a display device included in, or connected to, client device 110. The disclosed embodiments are not limited to any particular configuration of client device 110. For instance, client device 110 may be a mobile device that stores and executes mobile applications that provide financial-service-related functions offered by a financial service provider, such as an application associated with one or more financial accounts that a customer holds with financial service provider.

In one embodiment, a user 112 may use client device 110 to perform one or more operations consistent with the disclosed embodiments. In one aspect, user 112 may be a customer or potential customer of a merchant associated with merchant device 120. For instance, user 112 may transact with merchant device 120. In another aspect, user 112 may be a customer of the financial service provider associated with financial service provider device 130. For instance, the financial service provider may maintain a financial service account (e.g., checking account or the like) for user 112.

Merchant device 120 may be associated with a merchant, such as one or more providers of goods and/or services, such as a retailer, etc. Merchant device 120 may include one or more computing systems that are configured to perform computer-implemented processes, such as a server, desktop, laptop, mobile device, embedded system or other dedicated hardware, etc. Further, merchant device 120 may include one or more computing devices configured to process and handle purchase transactions at a physical location of the associated merchant, such as point of sale terminals, local servers, kiosks, barcode scanners, etc., at a retailer location. Merchant device 120 may be configured to perform financial transaction processes, such as receiving, processing, and handling purchase transactions, payment processes, etc. associated with the sale of goods and/or services provided by the associated merchant. In some aspects, merchant device 120 may include computing devices that may include back and/or front-end computing components that store consumer transaction data and execute software instructions to perform operations consistent with the disclosed embodiments, such as computers that are operated by employees of the associated merchant (e.g., back-office systems, etc.).

In certain aspects, a customer associated with client device 110 (e.g., user 112) may purchase goods and/or services from a merchant associated with merchant device 120. In some instances, the customer may use a financial account provided by a financial service provider to pay for the goods and/or services. In other instances, the customer may use another payment method, such as cash.

Financial service provider device 130 may be associated with a financial service provider. The financial service provider may be a bank, credit union, credit card issuer, or other type of financial service entity that generates, provides, manages, and/or maintains financial service accounts for one or more users (e.g., user 112). Financial service accounts may include, for example, checking accounts, savings accounts, credit card accounts, loan accounts, rewards accounts, and any other types of financial service account known to those skilled in the art. Financial service accounts may be associated with electronic accounts, such as a digital wallet or similar account that may be used to perform electronic transactions, such as purchasing goods and/or services online. Financial service accounts may also be associated with physical financial service account cards, such as a debit or credit card that a user may carry on their person and use to perform financial service transactions, such as purchasing goods and/or services at a point of sale terminal (i.e., merchant device 120).

The financial service provider may include infrastructure and components that are configured to generate and provide financial service accounts and financial service account cards (e.g., debit cards, credit cards, etc.). The financial service provider may also include infrastructures and components that are configured to manage transactions associated with a customer financial service account. In certain aspects, financial service provider device 130 may include one or more computing devices configured to communicate with client device 110 and merchant device 120 to via network 140 to execute processing steps associated with providing a customer service.

In certain aspects, the financial service provider associated with financial service provider device 130 may provide a primary financial service to a customer (e.g., user 112). For example, the financial service provider may maintain a credit card account with the customer, in a manner known in the art. In addition to the primary service (e.g., credit card account), the financial service provider may also provide "secondary benefits" in the form of additional services to the customer. These additional customer services may include, for example, rewards programs, extended warranties, travel assistance, insurance coverage, price protection, concierge services, identity protection, etc. In some aspects, these secondary benefits may be used in conjunction with the primary service. For example, an extended warranty may be available to a customer for products purchased with a credit card maintained with the financial service provider. It should be understood that the term "secondary" merely indicates that the benefits are associated with another service (e.g., provision of credit) but does not otherwise limit the scope of benefits that may be provided. Consistent with disclosed embodiments, components of system 100 may be cooperate over network 140 to provide secondary benefits to the customer, including use and processing of the secondary benefit.

Network 140 may be any type of network configured to provide communications between components of system 100. For example, network 140 may be any type of network (including infrastructure) that provides communications, exchanges information, and/or facilitates the exchange of information, such as the Internet, a Local Area Network, or other suitable connection(s) that enables the sending and receiving of information between the components of system 100. In other embodiments, one or more components of system 100 may communicate directly through a dedicated communication link(s) (not shown), such as a link between client device 110 and merchant device 120.

It is to be understood that the configuration and boundaries of the functional building blocks of system 100 has been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. For example, merchant device 120 may include financial service provider device 130 for performing operations associated with a private label financial account provided by a merchant associated with merchant device 120. Such alternatives fall within the scope and spirit of the disclosed embodiments.

Figure 2:
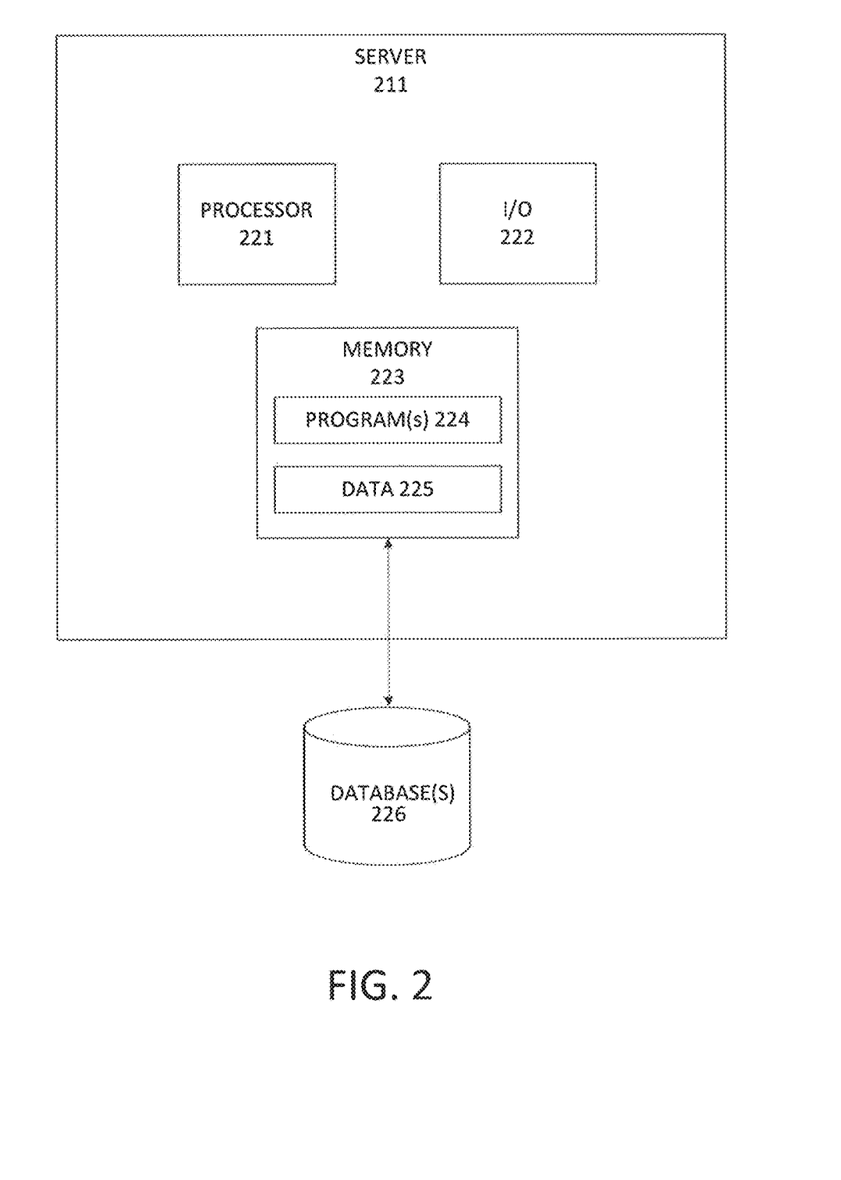
FIG. 2 is a block diagram of an exemplary server, consistent with disclosed embodiments.

FIG. 2 shows an exemplary server 211 for implementing embodiments consistent with the present disclosure. Variations of server 211 may be used by client device 110, merchant device 120, and/or financial service provider device 130.

In one embodiment, server 211 may include one or more processors 221, one or more memories 223, and one or more input/output (I/O) devices 222. According to some embodiments, server 211 may be an embedded system or similar computing devices that generate, maintain, and provide web site(s) consistent with disclosed embodiments. Server 211 may be standalone, or it may be part of a subsystem, which may be part of a larger system. For example, server 211 may represent distributed servers that are remotely located and communicate over a network (e.g., network 140) or a dedicated network, such as a LAN. Server 211 may correspond to any of client device 110, merchant device 120, and financial service provider device 130.

Processor 221 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in server 211.

Memory 223 may include one or more storage devices configured to store instructions used by processor 221 to perform functions related to disclosed embodiments. For example, memory 223 may be configured with one or more software instructions, such as program(s) 224 that may perform one or more operations when executed by processor 221. The disclosed embodiments are not limited to separate programs or computers configured to perform dedicated tasks. For example, memory 223 may include a single program 224 that performs the functions of the server 211, or program 224 could comprise multiple programs. Additionally, processor 221 may execute one or more programs located remotely from server 211. For example, client device 110, merchant device 120, and/or financial service provider device 130, may, via server 211, access one or more remote programs that, when executed, perform functions related to certain disclosed embodiments. Memory 223 may also store data 225 that may reflect any type of information in any format that the system may use to perform operations consistent with the disclosed embodiments.

I/O devices 222 may be one or more devices configured to allow data to be received and/or transmitted by server 211. I/O devices 222 may include one or more digital and/or analog communication devices that allow server 211 to communicate with other machines and devices, such as other components of system 100.

Server 211 may also be communicatively connected to one or more database(s) 226. Server 211 may be communicatively connected to database(s) 226 through network 140. Database 226 may include one or more memory devices that store information and are accessed and/or managed through server 211. By way of example, database(s) 226 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, system 200 may include database 226. Alternatively, database 226 may be located remotely from the system 200. Database 226 may include computing components (e.g., database management system, database server, etc.) configured to receive and process requests for data stored in memory devices of database(s) 226 and to provide data from database 226.

Figure 3:
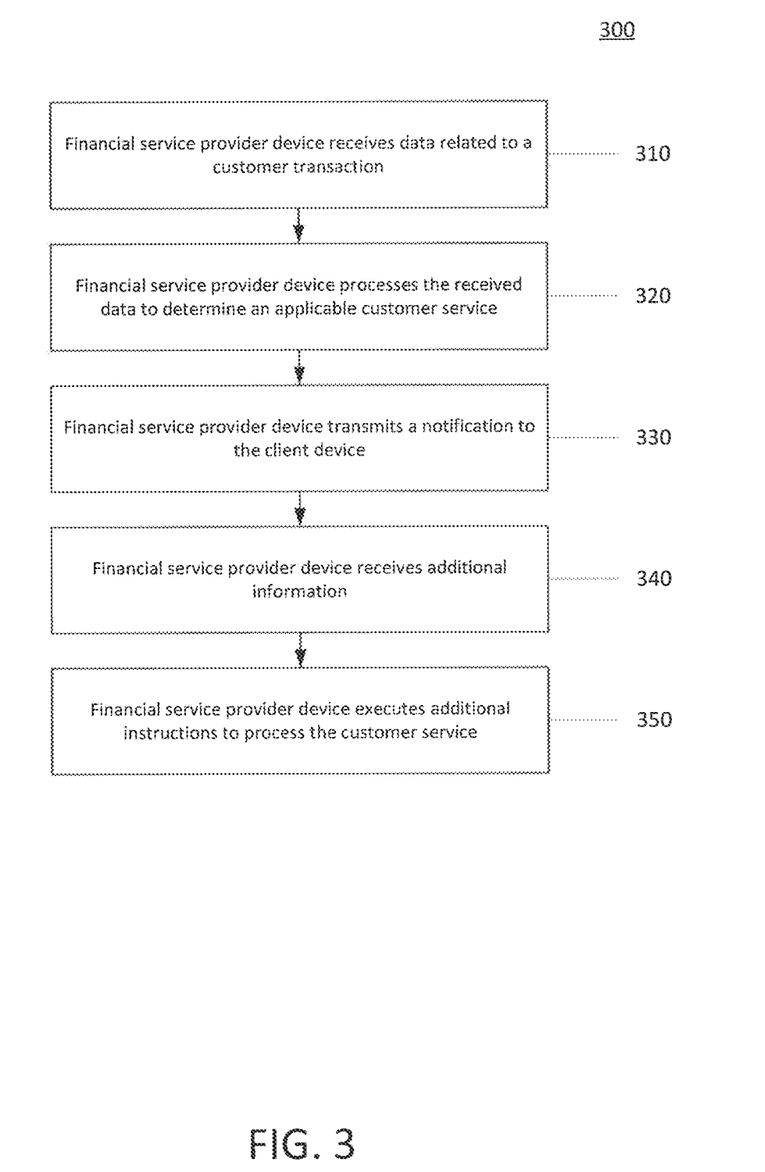
FIG. 3 is a flowchart of an exemplary process for providing a customer service, consistent with disclosed embodiments.

FIG. 3 is a flowchart of an exemplary process 300 for providing customer service. It some aspects, the customer service may be a secondary benefit associated with a primary service provided to a customer by a financial service provider. For example, the customer service may be one of a variety of additional benefits available to a customer that maintains a financial account (e.g., credit card, etc.) with the financial service provider. It should be understood, however, that the disclosed embodiments are not limited to these types of benefits, nor are they limited to being provided by a financial service provider. The exemplary disclosed embodiments may be applicable to any service provided to a customer.

Process 300 may include financial service provider device 130 receiving data related to a customer transaction (step 310). In some aspects, the data may be related to a transaction with a merchant associated with merchant device 120. The data may include information related to a potential transaction (pre-transaction data) and/or information related to a transaction that has already taken place (post-transaction data). Pre-transaction data may include a location of client device 110, which may be associated with the location of the customer (e.g., user 112), and/or information related to an item or service subject to the potential transaction (e.g., a product to be purchased). Post-transaction data may include information about a transaction that previously occurred, which may be received from client device 110 and/or merchant device 120. For example, post-transaction data may include information from merchant 120 regarding the purchase of a product by a customer with a credit card maintained by the financial service provider.

Location data may be determined by client device 110. For example, client device 110 may include a GPS device that provides geographic location information (not shown). In some embodiments, the GPS device may communicate with a GPS satellite navigation system that is used to determine the precise location of client device 110. The GPS device may decode time signal transmissions received from multiple satellites to determine the position of client device 110 using, for example, trilateration techniques performed by a processor executing software stored on a memory device within the GPS device. Client device 110, therefore, may calculate and transmit geographic position information (e.g., location coordinates or the like) associated with client device 110.

The data may also include customer data that allows financial service provider device 130 to determine a customer associated with client device 110. For example, the customer data may include login information associated with a financial services application on a mobile device. The customer data may identify the customer's name, contact information, account information, etc.

Process 300 may also include financial service provider device 130 processing the received data related to a customer transaction to determine an applicable customer service (step 320). For example, financial service provider device 130 may execute software instructions to determine if the received data corresponds to any customer services available to the customer that is associated with the data.

In some aspects, financial service provider device 130 may process the received data to determine the customer and financial account (e.g., credit card account) associated with the data. For example, financial service provider device 130 may receive post-transaction data indicating that a customer made a purchase at a particular retail merchant. In some embodiments, financial service provider device 130 may execute software instructions to search an electronic database to retrieve information that matches the received data, which may include customer-identifying information, financial account information, etc.

Based on the received information, financial service provider device 130 may determine that a customer service is available to the customer. In some embodiments, financial service provider device 130 may execute software instructions to identify one or more customer services that are associated with a financial account held by the customer and match the information received in step 310. For example, financial service provider device 130 may determine that the received data indicates a purchase at a retail merchant and may also determine that the customer who made the purchase is eligible for a customer service associated with the purchase (e.g., extended warranty coverage, etc.).

If financial service provider device 130 determines that a customer service is applicable, financial service provider device 130 may transmit a notification to client device 110 (step 330). In some aspects, the notification may alert the customer that the customer service is available. For example, in an embodiment in which the customer service determined in step 320 is a supplemental insurance plan (e.g., rental car insurance or the like), financial service provider device 130 may send a notification to client device 110, which may be a mobile device, to alert the customer of the availability of the insurance. The alert notification may be transmitted, for example, as an sms text message, a push notification, in-app notification, email, etc. in substantially real time (i.e., before the customer has purchased supplemental rental car insurance from the rental car dealer).

In other aspects, the notification may inform a customer of their eligibility for a customer service. For example, in an embodiment in which the service determined in step 320 is an extended warranty for a product, financial service provider device may send a notification to client device 120 that includes a message regarding whether the customer and/or product is eligible.

The notification may also include information about the available customer service. The information may include details such as terms of a potential agreement between the customer and financial service provider. For example, if the customer service is an extended warranty for a purchased product, the information in the notification may include the duration of the warranty and terms of the coverage.

Similarly, the information about the available customer service may include a potential cost and/or cost savings to the customer. In some embodiments, financial service provider device 130 may execute software instructions to calculate a cost of an available customer service to a customer. Financial service provider device 130 may also calculate and/or determine a cost of a similar service available to the customer and further calculate a potential difference (e.g., cost savings) between the services. For example, financial service provider device 130 may determine that a customer service (e.g., rental car insurance) is included as a secondary benefit at no cost to the customer. Financial service provider device 130 may also determine that a similar customer service (e.g., rental car insurance available through the rental car merchant) would include a particular cost to the customer. Financial service provider device 130 may calculate the particular cost and include it as information sent to client device 110. In some embodiments, calculated cost savings may be displayed to the customer via client device 110 such that the customer may consider cost when deciding whether to use the available customer service.

As described above, the information sent to client device 110 as part of the notification transmitted in step 330 may be displayed to a customer, such as via a display device connected to or part of client device 110. For example, client device 110 may be a mobile device (e.g., smart phone, tablet, etc.) that receives the notification transmitted from financial service provider device 130 and displays the notification to the customer (e.g., user 112). For example, if the notification is a text message, client device 110 may execute software instructions to process the received notification and display it to user 112 as a received text message in a manner known in the art.

It should be understood that the information transmitted to client device 110 from financial service provider device 130 may be processed by client device 110 through a software program, such as a mobile application. Client device 110 may execute software instructions to run the mobile application and present the information to user 112 in any manner. For example, client device 110 may store the information from financial service provider device 130 in an electronic database, and only display information when requested by user 112. Interactive menus and/or other selection tools may be provided by or via client device 110 to allow the customer to decide what information is displayed, stored, transmitted, etc.

In some embodiments, user 112 may interact with client device 110 to provide additional information regarding the available customer service. For example, client device 110 may receive input through an I/O device (e.g., touch screen, keypad, etc.), and store the input as data associated with the available service transmitted to client device 110 in step 330. The additional information may include information requested as part of the notification sent from financial service provider device 130. For example, the notification sent from financial service provider device 130 may include a prompt for additional information, such as the type of car the customer is considering renting or the name of a merchant at which a transaction may take place. In other aspects, the additional information may include an indication of acceptance or refusal of the customer service. For example, the customer may input to client device 110 an acceptance of the customer service 110, such as an extended warranty for a product to be purchased. The additional information may be transmitted by client device 110 to financial service provider device 130. In some instances, additional information may be transmitted by merchant device 120. For example, merchant device 120 may provide transaction information pertinent to the provision of a customer service.

Process 300 may further include financial service provider device 130 receiving the transmitted additional information (step 340). In some aspects, financial service provider device 130 may process the received additional information to further process and determine an applicable customer service. For example, financial service provider device 130 may execute software instructions to determine how the additional information affects a customer's eligibility for a customer service or how the additional information affects the customer service that is available to the customer. In other words, the additional information may allow financial service device 130 to complete a determination of which customer service(s) applies to the customer at that time. In these embodiments, steps 320-340 may be repeated to allow client device 110, merchant device 120, and financial service provider device 130 to communicate with each other through as many iterations as necessary to allow the financial service provider to provide and the customer to receive the information necessary to complete a customer service.

In other aspects, financial service provider device 130 may receive the additional information as an indication that a customer service has been accepted or declined by the customer. If the customer service has been accepted, financial service provider device 130 may execute additional software instructions to associate the accepted customer service with the customer's financial account. Financial service provider device 130 may execute additional processing, as necessary. For example financial service provider device 130 may send an additional notification to client device 110 to confirm that acceptance of the customer service has been received (e.g., a confirmation email). If the received additional information indicates that the customer has declined the customer service, financial service provider device may note the refusal of the service (e.g., store a message in a database), and/or process 300 may stop.

After steps 320-340 have completed as necessary, the customer may have decided to accept and/or use the customer service identified by financial service provider device 130. In some embodiments, financial service provider device 130 may execute additional instructions to process the customer service (step 350). For example, financial service provider device 130 may send a request for processing information, such as a proof of purchase (e.g., receipt), warranty information, insurance information, etc. The request may be transmitted by financial service provider device 130 and received by one or more of client device 110 and/or merchant device 120. Additionally or alternatively, financial service provider device 130 may receive processing information from one or more of client device 110 and merchant device 120. For example, a customer may use client device 110 to capture information, such as a picture of a receipt, ticket, baggage tag, completed claim form, etc., and transmit the information to financial service provider device 130. In some embodiments, a customer may use client device 110 to fill out a form to input information relevant to the customer service (e.g., description of issue, event, purchase, etc.) and include customer authentication (e.g., e-signature). The form may be transmitted to financial service provider device 130 by client device 110 as additional processing information.

Financial service provider device 130 may receive the processing information and execute instructions to use the information to further process the customer service. For example, financial service provider device 130 may store the received information and display it to an employee of the financial service provider for review and further processing. It should be understood that processing of an individual customer service may include any number of particular steps and requirements, which may be dependent on the particular customer service being processed.

In some embodiments of exemplary process 300, a customer may be alerted to the potential availability of a customer service, such as a secondary benefit that supplements a financial account relationship between the customer and a financial service provider. In addition, particular information relevant to the customer service, such as availability, eligibility, cost, cost savings, terms of agreement, etc., may be presented to the customer for use in making transaction decisions, such as whether to purchase an item, a warranty, an insurance plan, etc.

Figure 4:
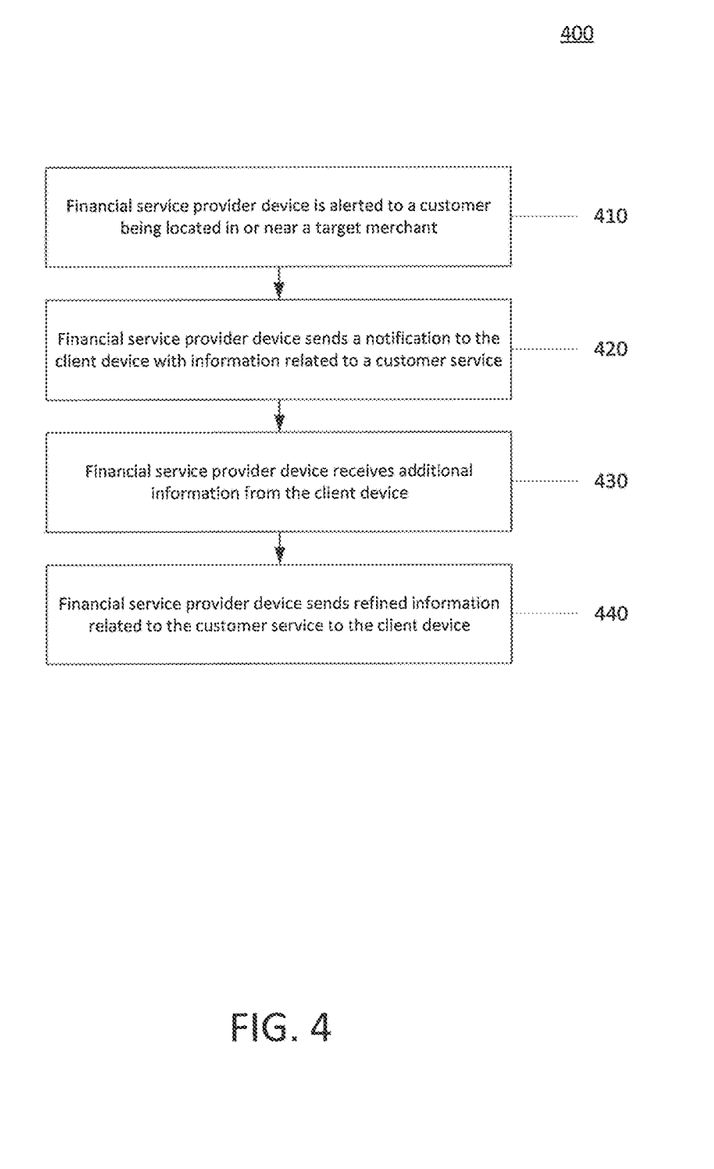
FIG. 4 is a flowchart of an exemplary process for providing information related to customer service before a transaction is made, consistent with disclosed embodiments.

FIG. 4 is a flowchart of an exemplary process 400 for providing information related to a customer service before a transaction is made. In some aspects, process 400 may be used to make a customer aware of a customer service at a time when the customer service may be useful. For example, process 400 may relate to notifying a customer that an insurance plan is available when the customer is at a merchant location where insurance coverage may be relevant.

Process 400 may include financial service provider device 130 being alerted that a customer is located in or near a target merchant (step 410). A target merchant may be a merchant (e.g., a merchant associated with merchant device 120) that is identified as being relevant to the customer service that may be subject to process 400. For example, if the customer service is rental car insurance, the target merchant may be a rental car service provider. Several target merchants (e.g., all rental car service providers within a specific area) may be simultaneous used in relation to process 400.

Financial service provider device 130 may be alerted that a customer is in or near a target merchant through the use of known geo-fencing processes. The geo-fencing process may include determining whether client device 110 is located within a predetermined location boundary near the target merchant. In order to determine if client device 110 is within the predetermined boundary, client device 110 may determine its own location, which may be determined via GPS or other location-based measurement. In some aspects, client device 110 may send the location information, such as latitude-longitude coordinates, to financial service provider device 130. Financial service provider device 130 may process the received information to determine if client device 110 is within a particular predetermined boundary associated with any target merchants.

In other aspects, client device 110 may determine that it is within a predetermined boundary of a target merchant and send only a notification (instead of location information) to financial service provider device 130 signaling a location near a target merchant. In some embodiments, a customer may use client device 110 to "check-in" to a particular location, such as a particular merchant, indicating where they are currently located. According to some embodiments, the customer may "check-in" via a social networking website or application using client device 110. Client device 110 may transmit the "check-in" information to financial service provider device 130 such that the financial service provider is notified of a customer's current location.

After being notified that a customer is in or near a target merchant, financial service provider device 130 may send a notification that includes information related to a customer service associated with the target merchant to client device 110 (step 420). For example, when financial service provider device 130 becomes alerted to a customer being in or near a rental car service provider, the notification may include information related to rental car insurance coverage that is available to the customer. The information may include, for example, a notification to the customer that the rental car insurance coverage is available to them as a secondary benefit (e.g., the service is available through a credit card account held with the financial service provider). It should be understood that financial service provider device 130 may perform additional processing to associate a particular client device 110 with a particular customer service and a target merchant, as well as any necessary determinations of eligibility, agreement terms, service parameters, etc.

In some embodiments, process 400 may end after the customer has been notified of the information sent from financial service provider device 130 to client device 110, which may be displayed to the customer by client device 110. In this way, process 400 may be used to make a customer aware of a customer service that is available to them at a time when the customer may want that information. For example, a customer may be alerted that they are covered for rental car insurance by their credit card provider as a secondary benefit, and therefore may be able to decline any insurance coverage offered by the rental car service provider.

In other embodiments, the customer may want more specific information regarding the available service, which may require additional communication between client device 110 and financial service provider device 130. In these embodiments, financial service provider device 130 may receive additional information from client device 110 (step 430). The additional information may be related to a possible transaction at a target merchant. For example, client device 110 may receive information about a particular vehicle that the customer is considering renting and send the information to financial service provider device 130. It should be understood that the information may be any relevant information related to a possible transaction that may allow financial service provider device 130 to further determine eligibility, agreement terms, service parameters, etc.

After receiving the additional information, financial service provider device 130 may send refined information related to the customer service to client device 110 (step 440). Financial service provider device 130 may perform additional processes necessary to determine eligibility, terms, parameters, etc. of a customer service, which may be based at least in part on the received additional information. Financial service provider device 130 may send the information to client device 110, such that client device 110 may display the information to the customer.

In some embodiments, the additional information sent to financial service provider device 130 may include information sufficient to determine a cost of the same or similar customer service available through the financial service provider (e.g., secondary benefit). For example, client device 110 may send information regarding a particular rental car service provider, a particular car the customer is considering renting, and any additional information necessary to allow financial service provider device 130 to determine a cost associated with rental car insurance that may be available through the rental car service provider. Financial service provider device 130 may send the calculated cost to client device 110 for display to the customer.

In some aspects, steps 430 and 440 of process 400 may allow a customer to be made aware of specific information potentially relevant to a transaction or potential transaction and/or a customer service associated with a transaction. As described above, the specific information may include eligibility, terms, parameters, cost, cost savings, etc., which may be relevant to a transaction and/or a customer service. For example, after a customer is made aware of possible rental car coverage through their financial service provider (e.g., via execution of steps 410 and 420), execution of steps 430 and 440 may allow the customer to find out more specific information about the rental car coverage, allowing the customer to decide based on a more complete understanding whether to purchase rental car insurance through the rental car service provider.

According to the above embodiment, process 400 may allow a financial service provider to alert a customer to a potential customer service at a time when the customer service is relevant to them, based on the customer's location (e.g., at a particular merchant). Further, process 400 may allow the financial service provider to engage the customer to provide the customer with specific information related to a customer service. In this manner, the customer may be apprised of specific information relevant to a customer service and a transaction or potential transaction with a merchant while they are at the merchant location. It should be understood that additional processes may be utilized in conjunction with process 400 to achieve these or other aspects.

Figure 5:
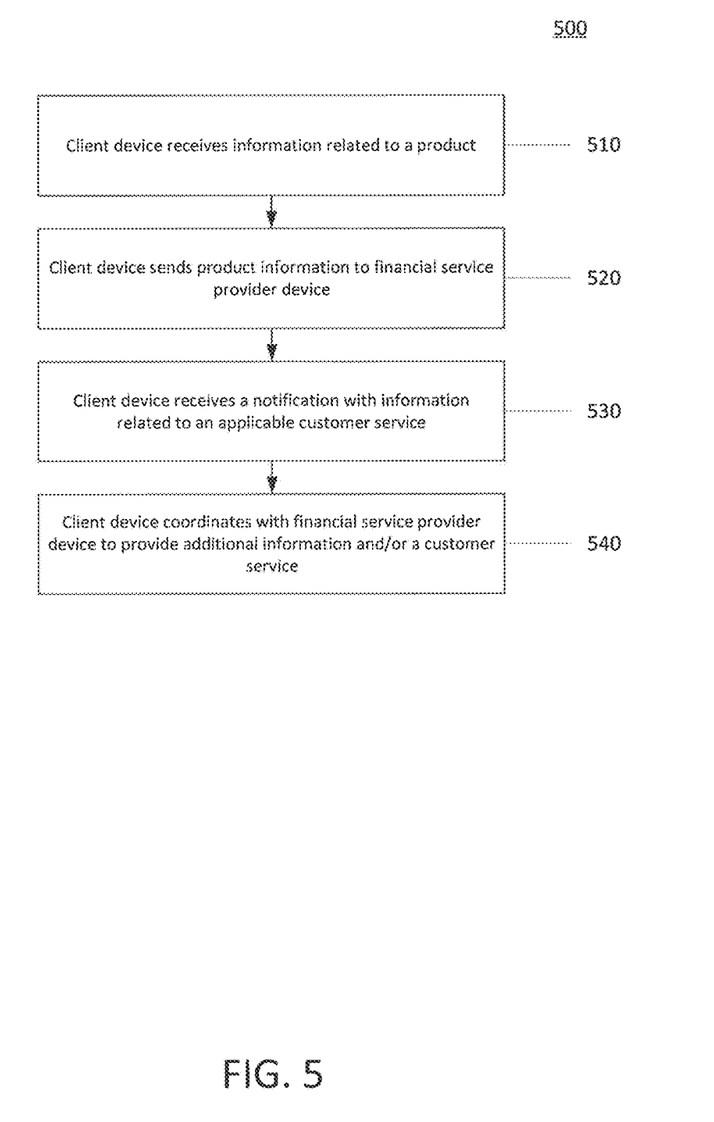
FIG. 5 is a flowchart of an exemplary process for using a client device to receive information related to a customer service, consistent with disclosed embodiments.

FIG. 5 is a flowchart of an exemplary process 500 for using client device 110 to receive information related to a customer service. In some embodiments, process 500 may be associated with a scenario in which a customer is seeking additional information about a customer service, such as a secondary benefit provided by a financial service provider. The customer may be interested in additional information about a specific customer service, or may be interested in general information about any applicable customer services. In some aspects, the customer service may be related to a product, such as an item or service the customer is interested in purchasing. In exemplary process 500, the customer service may be an extended warranty, product deals, rewards details, or other service related to a purchase of a product or service.

In an exemplary embodiment, client device 110 may receive information related to a product (step 510). In some aspects, the product may be an item that a customer associated with client device 110 (e.g., user 112) is considering purchasing. Client device 110 may receive the information related to the product through an I/O device associated with client device 110. In some embodiments, client device 110 may utilize optical technology (e.g., camera, scanner, etc.) to receive information related to a product by scanning a barcode (or other identification code) on the product. After scanning or otherwise decoding the barcode, client device 110 may execute software instructions to determine product information encoded in the barcode (e.g., product identifying information, product price, merchant information, etc.). Additionally or alternatively, client device 110 may receive product information as data entered by user 112.

After receiving the product information, client device 110 may send the information to financial service provider device 130 (step 520). For example, client device 110 may transmit a message to financial service provider device 130 over network 140 to alert the financial service provider that a customer is interested in information related to one or more customer services that may be available for the product associated with the information.

After financial service provider device 130 processes the received information (which may be in a manner consistent with process 400), client device 110 may receive a notification with information related to any applicable customer services from financial service provider device 130 (step 530). For example, client device 110 may receive a notification that the customer is eligible for an extended warranty for a product (e.g., the product for which information was received in step 510). In another example, the notification may include information such as product deals (e.g., discounts, incentives, competitor prices, etc.) and/or rewards program details. Client device 110 may execute software instructions to process the received notification such that it may be displayed or otherwise communicated to the customer (e.g., user 112).

In some embodiments, client device 110 may execute additional processes to coordinate with financial service provider device 130 to provide/receive additional information and/or a customer service (step 540). In some aspects, the additional processing may be consistent with the processing described with respect to process 400 (e.g., steps 430, 440).

In some aspects, process 500 may allow a customer to use client device 110 (e.g., a mobile device) to receive information about a product the customer may be interested in purchasing. In particular, process 500 may allow a customer to determine if any or a specific customer service is available in relation to the product. For example, a customer may be able to determine eligibility for any or a specific secondary benefit provided by a financial service provider. A customer (e.g., user 112) may scan a product barcode with client device 110, which may execute process 500 to provide information to the customer, such as availability of warranties, deals, insurance, etc., and any associated agreement terms.

Figure 6:
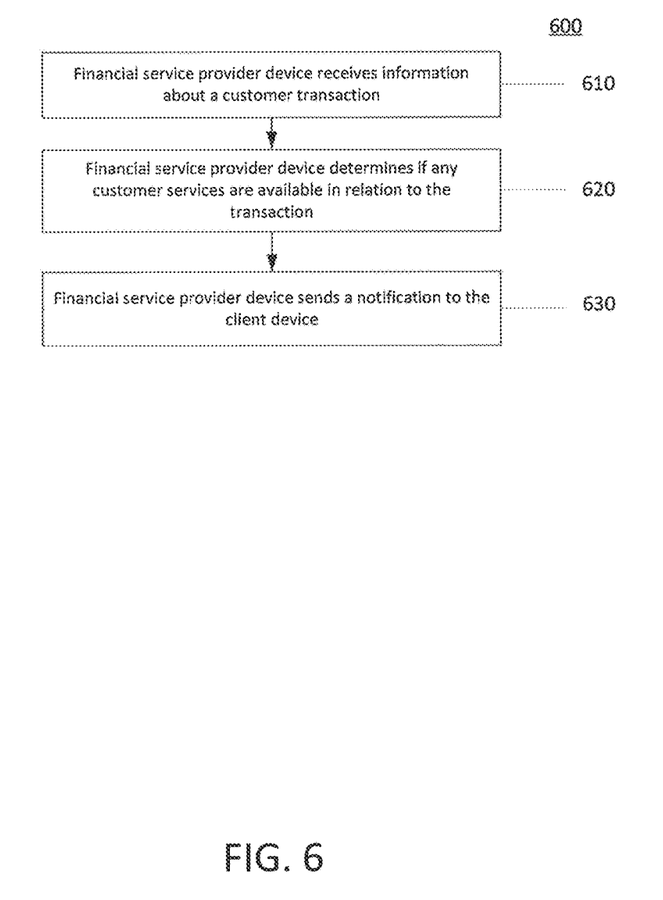
FIG. 6 is a flowchart of an exemplary process for notifying a customer of available customer service after a transaction has occurred, consistent with disclosed embodiments.

FIG. 6 is a flowchart of an exemplary process 600 for notifying a customer of an available customer service after a transaction has occurred. In some aspects, process 600 may be related to the same or similar customer services described with respect to processes 400 and 500.

Process 600 may include financial service provider device 130 receiving information about a customer transaction (step 610). For example, financial service provider device 130 may receive information from client device 110 and/or merchant device 120 (e.g., via network 140) indicating that a customer transaction has occurred. For example, the customer may complete the transaction using a financial service (e.g., credit card) maintained by the financial service provider, and the transaction details may be transmitted to financial service provider device 130 in a manner known in the art (e.g., existing payment channels).

Financial service provider device 130 may process the received information to determine if any customer services are available in relation to the transaction (step 620). After processing, financial service provider device 130 may send a notification to client device 110 to inform the customer of the available customer services (step 630). In some embodiments, the notification may be a message, such as an sms text message or an email. In other embodiments, the notification may be a transaction flag that incorporates the information into other information available to the customer, such as an online billing statement. The transaction flag may be presented to the customer in a manner that allows the customer to associate the information with the transaction. For example, an alert or indicator may be displayed adjacent the transaction listed on the customer's billing statement.

In exemplary embodiments of process 600, financial service provider device 130 may execute software instructions to determine if information related to a completed transaction (e.g., a transaction completed using a customer credit card) is related to customer travel (e.g., airline, train, bus tickets) and determine if travel-related customer services (e.g., trip cancellation insurance, lost-luggage protection) are available to the customer. Financial service provider device 130 may further send a notification to client device 110, such that a transaction flag is displayed adjacent the transaction in an interactive customer billing statement (e.g., a billing statement for the customer's credit card).

In some aspects, process 600 may increase customer awareness of available customer services even after a transaction has already occurred. For example, a customer may be informed of available travel-related customer services after completing a travel-related transaction. In this way, the customer may be apprised of information relevant to future transactions which may be helpful to the customer. For example, the customer may be aware of available trip-cancellation insurance and/or lost-luggage coverage.

Figure 7A:
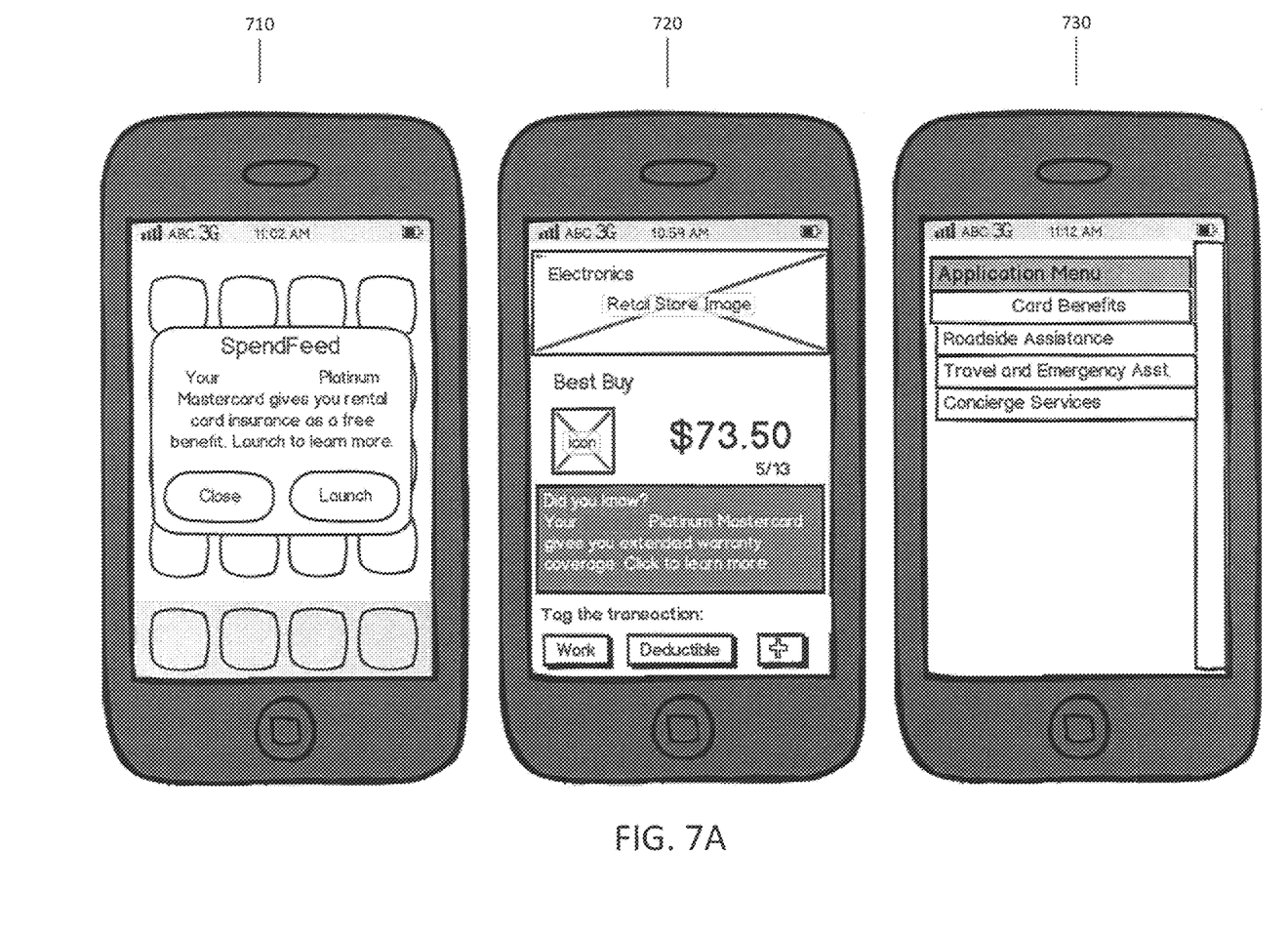
FIGS. 7A and 7B depict exemplary client device user interfaces displaying information resulting from one or more of the processes depicted in FIGS. 3-6, consistent with disclosed embodiments.

FIGS. 7A and 7B include exemplary depictions of user interfaces on a client device 110 depicting information (e.g., to user 112) consistent with disclosed embodiments, including information determined via one or more of processes 300-600. As shown in FIG. 7A, user interface 710 may include an exemplary message informing a customer (e.g., user 112) that their credit card includes rental car insurance coverage. User interface 720 may include an exemplary message that informs the customer that their credit card provides extended warranty coverage on a particular product which may be purchased at a particular retail merchant. User interface 730 may include an interactive menu and/or message prompts that allow the customer to control client device 110 to work in conjunction with financial service provider device 130 to provide additional customer service information that may interest the customer.

Figure 7B:
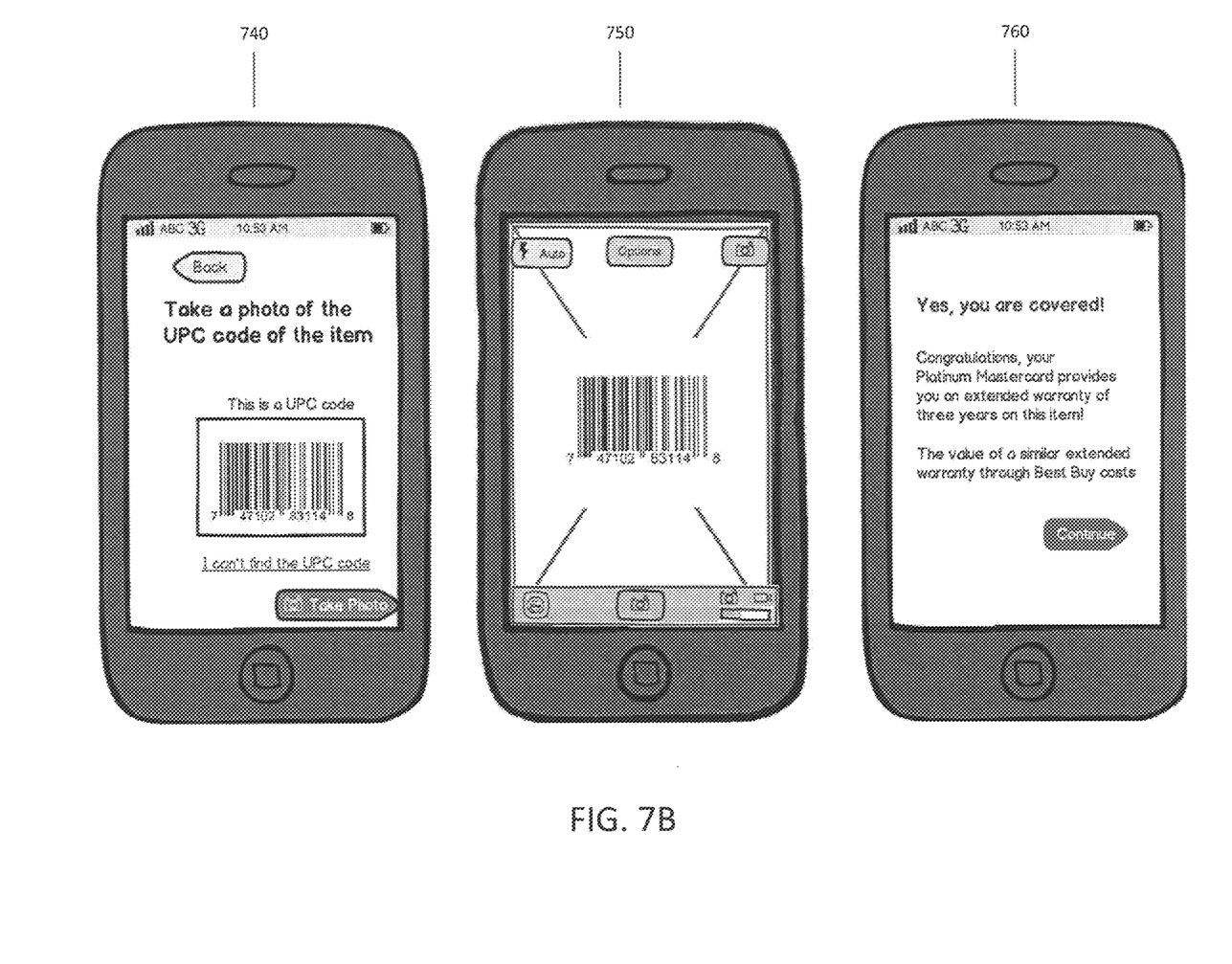

As shown in FIG. 7B, user interfaces 740, 750, and 760 may include exemplary messages displayed by client device 110 during, for example, process 500. For example, user interface 740 may prompt user 112 to scan a barcode associated with a product. User interface 750 may allow user 112 to use a camera function associated with client device 110 to take an image (i.e., scan) of the barcode. User interface 760 may include a message informing the customer that the product associated with the scanned barcode is covered for extended warranty coverage (e.g., after it is determined via process 500). As shown, user interface 760 may include additional information, such as terms of the warranty and potential cost and/or cost savings associated with a similar plan.

As described above, processes 300-600 may be executed by one or more of financial service provider device 130, client device 110, and merchant device 120 to allow a financial service provider to provide information related to available customer services. Consistent with processes 400 and 500, the financial service provider may be able to determine a particular time and place that the information may be relevant to the customer, and deliver the information to the customer accordingly. Consistent with process 600, the financial service provider may be able to use completed transaction details to inform the customer of available customer services relevant to the transaction. Further, as described in relation to process 300, the financial service provider may be able to provide (e.g., process and complete) the customer service if the customer decides to use it. In this way, the exemplary disclosed processes 300-600 may be used to increase customer awareness and ease of use of customer services, such as secondary benefits.

The exemplary disclosed embodiments describe systems and methods for providing a customer service. The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone. Furthermore, although the above description primarily refers to a financial service provider making determinations regarding the secondary benefits of its customers, one of skill in the art would appreciate that disclosed embodiments are not limited to the financial industry and may be employed in other fields.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system, comprising:
   one or more memory devices storing software instructions; and
   one or more processors configured to execute the software instructions to perform operations comprising:
   receiving customer data and location data from a client device, the received location data being derived from a Global Positioning System (GPS) device of the client device;
   identifying a customer associated with the client device based on the customer data;
   identifying a merchant by determining, based on the received location data, the client device is located within a predetermined boundary associated with a location of the merchant;
   determining, based on at least the identified merchant and the identified customer, eligibility of the customer for a credit card secondary benefit associated with a good or a service of the merchant;
   transmitting, before a transaction with the merchant has occurred and based on the determined eligibility, a notification to the client device, the notification comprising an option for the customer to receive the credit card secondary benefit;
   receiving, from the client device, acceptance of the credit card secondary benefit;
   receiving information associated with a transaction between the identified customer and the identified merchant for the good or the service associated with the accepted secondary benefit; and
   activating the credit card secondary benefit.

2. The system of claim 1, wherein the operations further comprise:
   initiating completion of a customer registration process to complete customer eligibility for the credit card secondary benefit.

3. The system of claim 2, wherein completing the customer registration process comprises receiving first eligibility information from the client device.

4. The system of claim 3, wherein the first eligibility information comprises at least one of a picture of a receipt associated with a transaction with the merchant for the good or the service associated with the credit card secondary benefit.

5. The system of claim 1, wherein the transaction information is received from a merchant device associated with the identified merchant.

6. The system of claim 1, wherein the credit card secondary benefit comprises insurance coverage from the merchant associated with at least one of the good or the service.

7. The system of claim 6, wherein the credit card secondary benefit comprises rental car insurance.

8. The system of claim 1, wherein the operations further comprise:
receiving, second eligibility information from the client device, the second eligibility information comprising one or more of product information, service information, or location information;
determining customer eligibility for the credit card secondary benefit based on the second eligibility information; and
transmitting a refined customer service option to the client device.

9. The system of claim 1, wherein the operations further comprise:
determining a cost savings associated with use of the credit card secondary benefit; and
transmitting the cost savings as part of the notification.

10. A method, comprising:
receiving customer data and location data from a client device, the received location data derived from a Global Positioning System (GPS) device of the client device;
identifying a customer associated with the client device based on the received customer data;
identifying a merchant by determining, based on the received location data, the client device is located within a predetermined boundary associated with a location of the merchant;
determining, based on at least the identified merchant and the identified customer, eligibility of the customer for a credit card secondary benefit associated with a good or a service of the merchant;
transmitting, before a transaction with the merchant has occurred and based on the determined eligibility, a notification to the client device, the notification comprising an option for the customer to receive the credit card secondary benefit;
receiving customer input from the client device in response to the notification, the customer input indicating acceptance of the credit card secondary benefit;
receiving information associated with a transaction between the identified customer and the identified merchant for the good or the service associated with the accepted secondary benefit; and
activating the credit card secondary benefit based on the customer input.

11. The method of claim 10, wherein the credit card secondary benefit comprises insurance coverage for at least one of the good or the service associated with the transaction.

12. The method of claim 10, wherein the received transaction information comprises descriptive information associated with a customer purchase.

13. The method of claim 12, wherein the credit card secondary benefit comprises a warranty agreement for the customer purchase.

14. The method of claim 10, wherein the transaction comprises a travel transaction, and wherein the credit card secondary benefit comprises a customer travel benefit.

15. The method of claim 14, wherein the customer travel benefit comprises one or more of trip cancellation insurance or lost-luggage protection.

16. A system, comprising:
one or more memory devices storing software instructions; and
one or more processors configured to execute the software instructions to perform operations comprising:
receiving customer location data, the received customer location data being derived from a Global Positioning System (GPS) device included in a client device;
identifying a customer associated with the client device;
identifying a merchant by determining, based on the received location data, the client device is located within a predetermined boundary associated with a location of the merchant;
transmitting to the client device, before a transaction with the merchant has occurred and in response to the identification of the customer and the merchant, a credit card secondary benefit associated with a good or a service of the merchant;
receiving, by operation of the customer, acceptance of the credit card secondary benefit;
receiving information associated with a transaction between the identified customer and the identified merchant for the good or the service associated with the accepted secondary benefit; and
activating the credit card secondary benefit.

17. The system of claim 16, wherein receiving the information associated with the transaction comprises receiving transaction data from a barcode on a product associated with the transaction.

18. The system of claim 16, wherein the credit card secondary benefit comprises a warranty agreement for a product associated with the transaction.

19. The system of claim 16, wherein the credit card secondary benefit comprises at least one of an offer, a deal, or a coupon for a product associated with the transaction.

* * * * *